United States Patent [19]

Durajczyk et al.

[11] Patent Number: 4,579,334
[45] Date of Patent: Apr. 1, 1986

[54] APPARATUS FOR INDICATING THE STATUS OF SHEETS

[75] Inventors: Jan Durajczyk; David A. Hain, both of Dundee, Scotland

[73] Assignee: NCR Corporation, Dayton, Ohio

[21] Appl. No.: 590,293

[22] Filed: Mar. 16, 1984

[30] Foreign Application Priority Data

Nov. 21, 1983 [GB] United Kingdom ............... 8331021

[51] Int. Cl.⁴ .............................................. B65H 7/12
[52] U.S. Cl. .................................... 271/263; 209/603; 209/604; 209/534
[58] Field of Search ............... 271/263; 209/534, 603, 209/604, 605

[56] References Cited

U.S. PATENT DOCUMENTS

| 3,179,403 | 4/1965 | Gagg | 271/263 |
| 3,581,402 | 6/1971 | London et al. | 33/174 |
| 3,608,894 | 9/1971 | Ariyama | 271/263 |
| 3,746,333 | 7/1973 | Capetti | 271/263 |
| 3,902,716 | 9/1975 | Lewis | 271/263 |
| 4,021,030 | 5/1977 | Fichte | 271/263 X |
| 4,154,437 | 5/1979 | Butcheck et al. | 271/6 |
| 4,420,747 | 12/1983 | Kistner | 271/263 X |

FOREIGN PATENT DOCUMENTS

| 0080309 | 6/1983 | European Pat. Off. |
| 451607 | 8/1936 | United Kingdom . |
| 597880 | 2/1948 | United Kingdom . |
| 949215 | 2/1964 | United Kingdom . |
| 1208931 | 10/1970 | United Kingdom . |
| 1295101 | 11/1972 | United Kingdom . |
| 1476507 | 6/1977 | United Kingdom . |
| 1497181 | 1/1978 | United Kingdom . |
| 1529815 | 10/1978 | United Kingdom . |
| 2106081 | 4/1983 | United Kingdom . |

Primary Examiner—Richard A. Schacher
Attorney, Agent, or Firm—Albert L. Sessler, Jr.; Elmer Wargo

[57] ABSTRACT

A note checking apparatus for indicating whether normal single notes, double notes or notes having local attachments of folds are passing therethrough includes two rollers 10 and 12 between which the notes pass. The roller 10 has a fixed axis, and the roller 12 is supported by pivotably mounted arms 38 so that it is movable away from, and pivotable relative to, the roller 10 in response to notes passing between the rollers. Sensors 42 and 43 produce voltage output whose magnitude varies in dependence on the amount of movement of the ends of the roller 12 away from the roller 10. In order to enable the apparatus to distinguish between double notes and a single note having a central local attachment, there are provided biasing rolls 56 and 58 which, during the passage of single or multiple notes between the rollers 10 and 12, are arranged to apply to the roller 12 first a pivoting moment in one direction and then a pivoting moment in the opposite direction.

6 Claims, 11 Drawing Figures

APPARATUS FOR INDICATING THE STATUS OF SHEETS

BACKGROUND OF THE INVENTION

This invention relates to an apparatus for indicating the status of sheets, and has particular application to an apparatus for indicating the status of currency notes.

In automatic currency note handling apparatus, such as cash dispensers or note counters, it is often necessary to detect the passage of multiple notes and to detect folds therein and any local attachments such as adhesive tape, staples or paper clips. In some applications, such as in a cash dispenser, it may be desired to count double notes as two notes and dispense them to a customer, while any notes having local attachments or folds are diverted to a reject bin as being in an unfit condition for dispensing to a customer. On the other hand, in other applications it may be desired to divert multiple notes into a reject bin but to permit notes having folds or local attachments to be passed through the apparatus for further handling. Thus, in order to optimize the operation of automatic currency note handling apparatus, it is desirable to identify not only the presence of an abnormality in note flow, but also to identify the particular type of abnormality so that proper action can be taken.

An apparatus for indicating the status of sheets and which is capable of distinguishing between different types of abnormalities, for example between a double sheet and a sheet carrying a local attachment, is known from European Patent Application No. 82306037.1 (Publication No. 0, 080, 309). An apparatus known from this European application includes a datum roller and a follower roller between which currency notes are fed in operation, the datum roller having a fixed axis and the axis of the follower roller being movable relative to that of the datum roller. The follower roller is biased towards the datum roller, and the ends of the follower roller are each supported by a pivotable bracket whereby the axis of the follower roller is tiltable relative to that of the datum roller. Two sensors are respectively arranged adjacent the ends of the follower roller. In response to a note passing through the nip of the rollers, each sensor produces a change in its output voltage, the magnitude of the change being dependent on the amount by which the corresponding end of the follower roller is displaced from the platen roller. The output voltages of the sensors are applied to an analyzing circuit whereby it is possible to determine an abnormality in the note flow such as a double note or a note having a fold or a local attachment. The sensors may be implemented by linear variable differential transformers.

The disadvantage of the known apparatus described above is that it may not be capable of distinguishing between a double currency note and a single note carrying a centrally positioned adhesive tape extending across the whole width of the note, as in the case of two halves of a torn note joined together by adhesive tape (which is a situation commonly encountered). Thus, if a note passing through the apparatus has such centrally positioned tape of thickness equal to that of the note, the two ends of the follower roller will be displaced from the datum roller by the same amount as would be the case if a double note were passing through the nip of the rollers.

SUMMARY OF THE INVENTION

It is accordingly an object of this invention to provide an apparatus for indicating the status of sheets which apparatus does not suffer from the disadvantage referred to above.

In a preferred embodiment of this invention, there is provided an apparatus for indicating the status of sheets passing therethrough, comprising: first and second rollers between which said sheets pass in operation; means for mounting said first roller on a first axis of rotation; means for mounting said second roller so that its axis is pivotable relative to that of said first roller and so that it is biased towards said first roller to enable the ends of said second roller to be displaced from corresponding ends of said first roller in response to a said sheet passing between said first and second rollers; first and second sensing devices spaced apart along said second roller and each arranged to produce an output signal which changes in dependence on the amount of movement of the adjacent part of said second roller towards or away from said first roller; and biasing means for applying at least one pivoting moment to said second roller as a said sheet passes between said first and second rollers.

BRIEF DESCRIPTION OF THE DRAWING

The preferred embodiment of this invention will now be described by way of example with reference to the accompanying figures, in which.

DETAILED DESCRIPTION OF THE INVENTION

Referring to FIGS. 1 to 4, the currency note status indicating apparatus, designated generally as 9, includes first and second steel rollers 10 and 12 (shown partly broken away in FIG. 1) between which currency notes whose status is to be determined are passed in operation. The roller 10 has a fixed axis of rotation, and the axis of the roller 12 is movable relative to that of the roller 10. The length of each of the rollers 10 and 12 is somewhat greater than the lengths of the notes, so that the whole of each note passes between the rollers 10 and 12.

Figure 1:
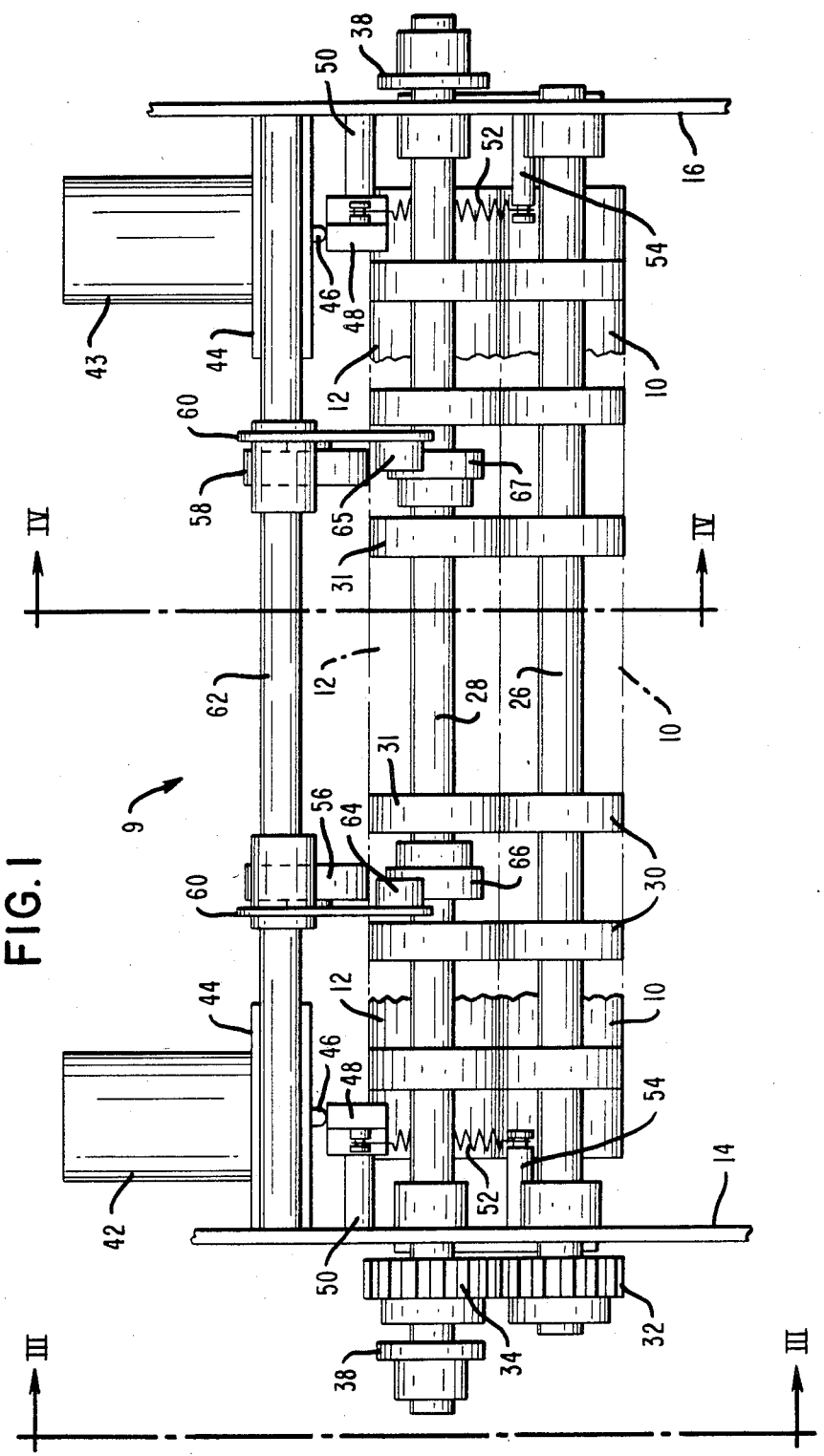
FIG. 1 is a front, elevational view of a currency note status indicating apparatus made according to this invention.
Figure 2:
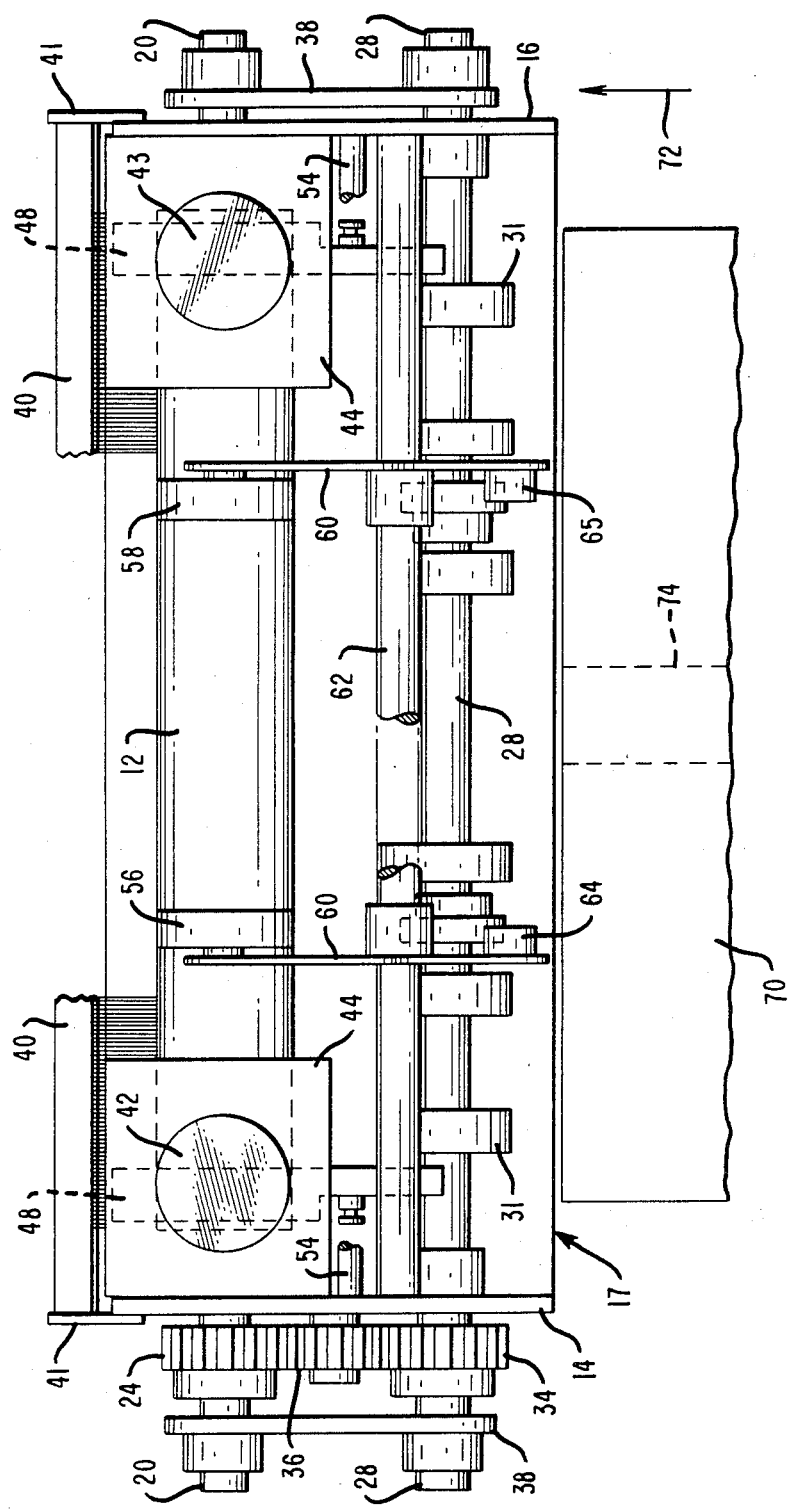
FIG. 2 is a plan view of the apparatus shown in FIG. 1.

The rollers 10 and 12 are rotatably mounted between two fixed, parallel side plates 14 and 16 of a support frame 17 (FIG. 2). The roller 10 is supported by two shafts 18 (FIG. 3) respectively extending from the ends thereof and rotatably mounted on the side plates 14 and 16. The roller 12 is similarly supported by two shafts 20 respectively extending from the ends thereof and passing through clearance apertures (not shown) formed in the side plates 14 and 16. Meshing gear wheels 22 and 24 (FIG. 3) are respectively secured to the ends of the shafts 18 and 20 projecting beyond the side plate 14.

Two shafts 26 and 28 (FIG. 1) are rotatably mounted one above the other between the side plates 14 and 16, the shafts 26 and 28 carrying cooperating rubber feed rolls 30 and 31. The shaft 28 is driven by an electric motor (not shown). Meshing gear wheels 32 and 34 (FIG. 3) are respectively secured to corresponding ends of the shafts 26 and 28 projecting beyond the side plate 14, the gear wheel 32 being connected to the gear wheel 22 via an intermediate gear wheel 36 rotatably mounted on the side plate 14.

Figure 3:
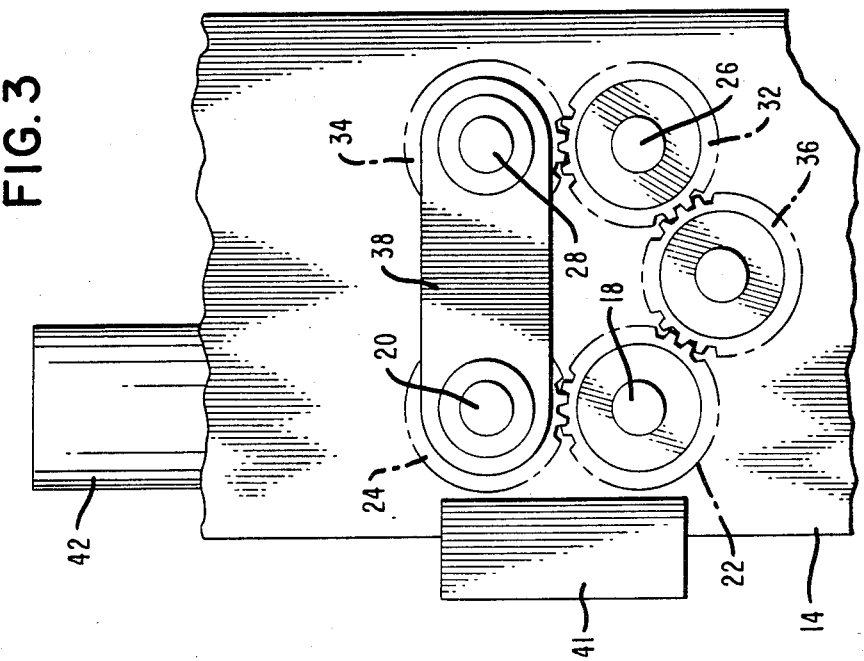
FIG. 3 is a side, elevational view of the apparatus shown in FIG. 1, taken along the line III—III of FIG. 1.

Referring particularly to FIG. 3, the support shafts 20 for the roller 12 are rotatably supported by corresponding ends of support arms 38, the other ends of the arms 38 being rotatably mounted on the shaft 28. The support arms 38 permit the roller 12 to rest in contact with the roller 10 when no currency note is passing through the apparatus, and permit the roller 12 to be moved upwardly away from the roller 10 when notes are passing between them. Also, the mounting arrangement for the roller 12 permits the axis of this roller to be tilted relative to the axis of the roller 10 if, for example, a currency note having a local attachment at one side passes between the rollers 10, 12.

Two brushes 40 (shown partly broken away in FIG. 2) are mounted (via plates 41) between the side plates 14 and 16, each brush 40 engaging a respective one of the rollers 10 and 12 along the whole length thereof for the purpose of removing from the roller any dirt which may have been transferred to it from currency notes passing through the apparatus.

The apparatus 9 employs two sensors 42 and 43 (FIGS. 1-4) which are mounted on support brackets 44 and which are respectively positioned adjacent to the ends of the roller 12. Each sensor 42 and 43 has a sensing stylus 46 (FIG. 1) which engages the upper surface of a respective interface arm 48, the lower surface of each arm 48 being provided with a curved recess 49 (FIG. 4) which engages the roller 12. Each of the sensors 42 and 43 produces an output voltage that varies in response to movement of the respective sensing stylus 46, the magnitude of the voltage change being in direct proportion to the amount of stylus movement. The sensors 42 and 43 are preferably implemented by linear, variable differential transformers, such as model 1305 manufactured by Penny and Giles Limited of Christchurch, England.

The interface arms 48 (FIG. 4) are made of low friction, hard-wearing plastics material. Each arm 48 is pivotally mounted at one end on a respective stud 50 secured to the adjacent side plate 14 or 16, the arm 48 being urged into engagement with the roller 12 by means of a respective tension spring 52. The end of each spring 52 that is remote from the respective arm 48 is connected to a stud 54 that is secured to the adjacent side plate 14 or 16.

As mentioned previously, the axis of the roller 12 (FIG. 1) is tiltable relative to that of the roller 10. The apparatus includes a rocking means for applying a rocking moment to the roller 12 while a note is passing between the rollers 10 and 12, for a reason which will be explained hereinafter. The rocking means includes rubber biasing rolls 56 and 58 each of which is rotatably mounted on one end of a respective bell-crank lever 60 (seen best in FIG. 4) pivotally mounted on a shaft 62 extending between the side plates 14 and 16. The rolls 56 and 58 engage the roller 12 and are disposed on either side of the center of the roller 12. Two cam followers 64 and 65 are respectively mounted on those ends of the bellcrank levers 60 that are remote from the rolls 56 and 58. The cam followers 64 and 65, respectively, engage two cams 66 and 67 that are secured to the shaft 28. The cams 66 and 67 have the same configuration; however, they are angularly displaced with respect to each other on the shaft 28. Each cam 66 and 67 has a high region 68 (see FIG. 4) which extends over approximately one-third of the periphery of the cam, and the cams 66 and 67 are so arranged that the high region 68 of the cam 67 comes into engagement with the follower 65 immediately after the high region 68 of the cam 66 becomes disengaged from the follower 64. Thus, as the shaft 28 rotates, the roll 56 applies a rocking moment to the roller 12 (in a counterclockwise direction with reference to FIG. 1) when the high region 68 of the cam 66 is in contact with the follower 64. Immediately following the end of the application of this counterclockwise rocking moment, the roll 58 applies a rocking moment to the roller 12 in a clockwise direction (as viewed in FIG. 1) when the high region 68 of the cam 67 is in contact with the follower 65. It should be understood that the resilient nature of the rolls 56 and 58 permits a certain amount of movement of the roller 12 away from the roller 10, or permits a small tilting movement of the roller 12, to take place. Also, it should be understood that the gear wheels 22 and 24 intermesh to a sufficient extent to ensure that they remain in engagement with each other despite any displacement of the adjacent end of the roller 12 away from the roller 10 which may occur in operation.

Figure 4:
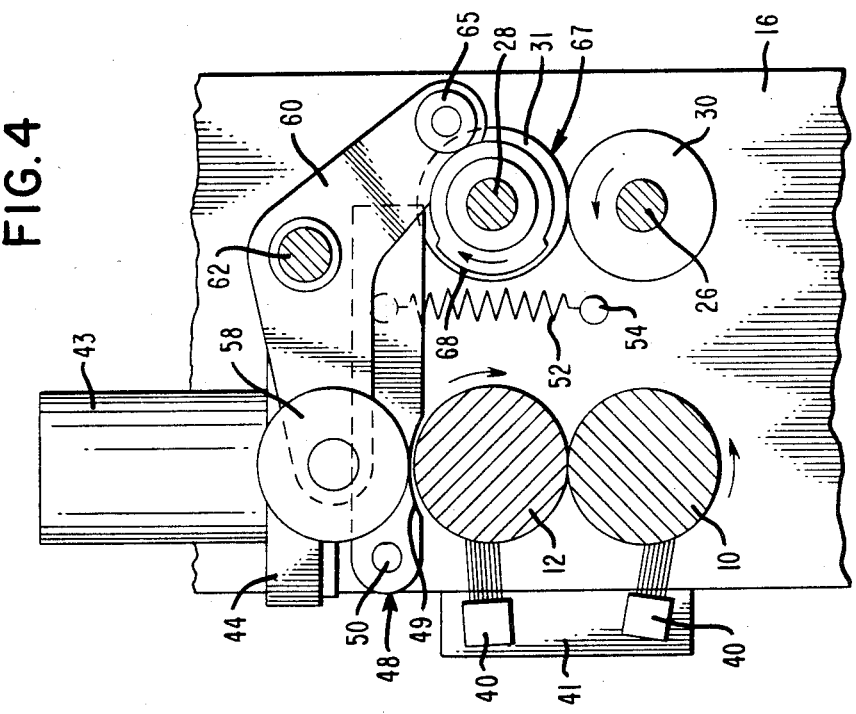
FIG. 4 is a part-sectional, elevational view taken along the line IV—IV of FIG. 1.

In operation, the drive shaft 28 brings about rotation of the rollers 10 and 12 and the shaft 26 in the directions indicated by the arrows in FIG. 4 via the gear train 22, 24, 32, 34, and 36. Currency notes to be sensed, such as the note 70 shown in FIG. 2, are fed one by one to the apparatus 9 in the direction indicated by the arrow 72, the long dimension of each note being parallel to the axes of the shafts 26 and 28. Each note 70 is gripped in turn by the feed rolls 30 and 31 and is fed by them into the nip of the steel rollers 10 and 12, the note then passing between the rollers 10 and 12 and being driven by them out of the apparatus 9 for further processing.

Figure 5A:
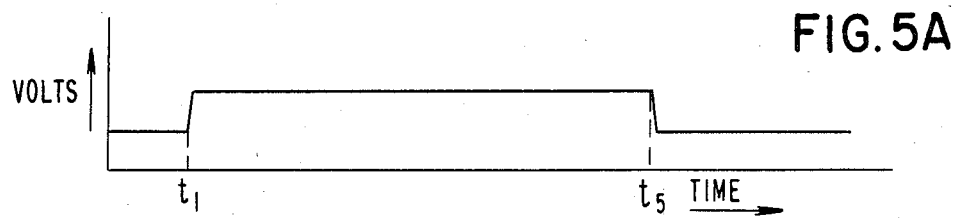
FIGS. 5A to 5F show a series of waveforms representing the outputs of the sensors of the apparatus of FIG. 1.
Figure 5B:
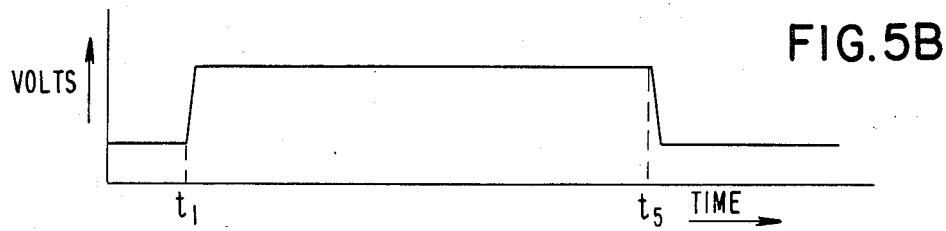

Reference will now be made to FIGS. 5A to 5F in connection with a further explanation of the operation of the apparatus 9. As a single note 70 passes between the rollers 10 and 12, the roller 12 is displaced upwardly away from the roller 10, thereby bringing about an increase in the output voltages of the sensors 42 and 43 as shown in FIG. 5A which represents the output voltage of each of the sensors 42 and 3 when a single note passes between the rollers 10 and 12. FIG. 5B represents the output voltage of each of the sensors 42 and 43 when a double note passes between the rollers 10 and 12; in this case, the increase in output voltage is about twice that which occurs for a single note passing between the rollers 10, 12. In both FIGS. 5A and 5B, time $t_1$ represents the time when the single or double note enters the nip of the rollers 10 and 12, and time $t_5$ represents the time when the single or double note leaves the nip of the rollers.

Figure 5C:
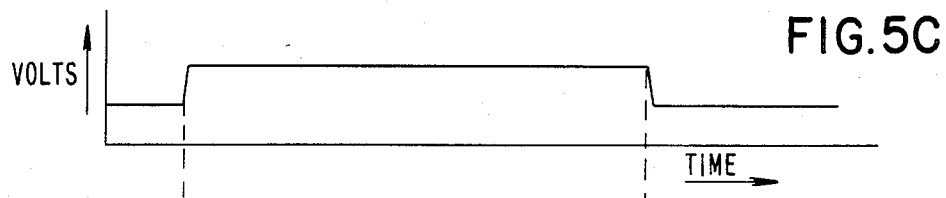
Figure 5D:
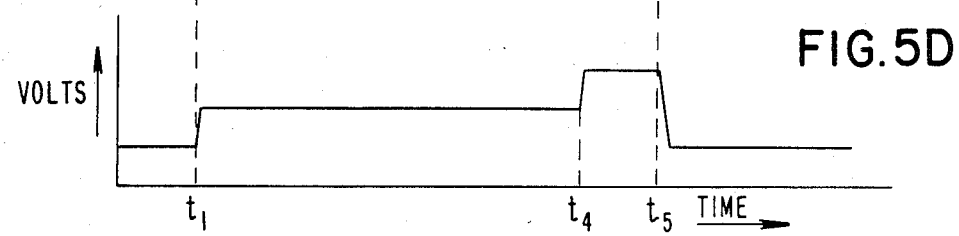

FIGS. 5C and 5D, respectively, show the output voltages of the sensors 42 and 43 when the right-hand trailing corner (with reference to FIG. 2) of a note 70 carries a local attachment such as adhesive tape (or when this corner is folded over), times $t_1$ and $t_5$ again representing the times when the note enters and leaves the nip of the rollers 10 and 12. In this case, the increase in the output voltage of the sensor 42 is substantially the same as that shown of the sensor 42 is substantially the same as that in the case of a normal, single note passing between the rollers 10 and 12. However, with regard to the output voltage of the sensor 43 when the local attachment enters the nip of the rollers 10 and 12 at time $t_4$, there is an additional increase in the output voltage of the sensor 43 due to the displacement of the adjacent end of the roller 12 away from the roller 10, the axis of the roller 12 tilting relative to that of the roller 10.

Figure 5E:
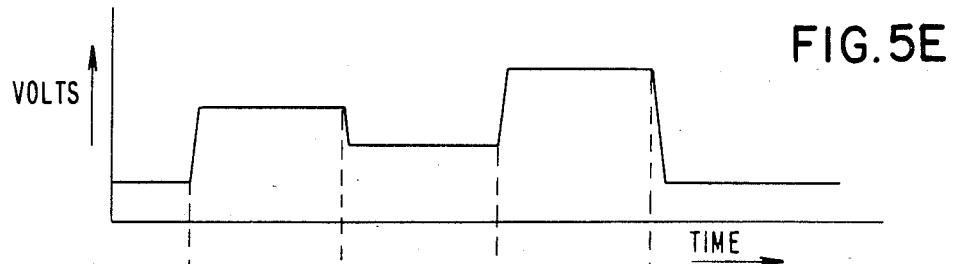
Figure 5F:
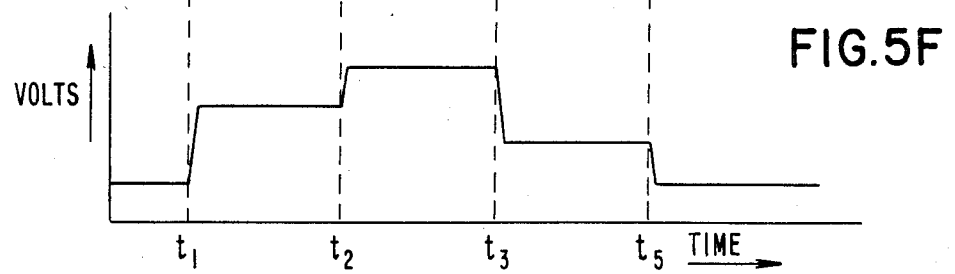

FIGS. 5E and 5F, respectively, show the output voltages which occur when there passes between the rollers 10 and 12 a note carrying a length of adhesive tape centrally positioned relative to the short edges of the note, as indicated by the attachment 74 indicated in dotted outline in FIG. 2. In the arrangement illustrated, at the time $t_1$ when such a note 70 enters the nip of the rollers 10 and 12, both followers 64 and 65 are in engagement with the low regions of the cams 66 and 67 so that initially both sensors 42 and 43 produce output voltages corresponding to the outputs which they produce when a double note passes between the rollers 10 and 12 (it being assumed that the thickness of the tape is substantially equal to the thickness of the note). Upon the high region 68 of the cam 66 coming into engagement with the follower 64 at time $t_2$, the associated roll 56 bears down on the adjacent part or first half of the roller 12 so that the roller 12 rocks in a counterclockwise direction (with reference to FIG. 1) about the attachment 74, thereby bringing about an additional increase in the output voltage of the sensor 43 (FIG. 5F) and a decrease in the output voltage of the sensor 42 (FIG. 5E). Upon the high region 68 of the cam 67 coming into engagement with the follower 65 at time $t_5$ (at which time the high region 68 of the cam 66 moves out of engagement with the follower 64), the roll 58 bears down on the second half of the roller 12, and the roller 12 rocks in a clockwise direction about the attachment 74, thereby bringing about an increase in the output voltage of the sensor 42 and a decrease in the output voltage of the sensor 43. At time $t_5$, the note leaves the nip of the rollers 10 and 12, whereupon, the output of each of the sensors 42 and 43 returns to its initial value. Also, in the arrangement illustrated, at time $t_5$, the low region of the cam 67 returns into engagement with the follower 65.

Thus, by virtue of the pivotal mounting of the roller 12 and the cam-controlled biasing rolls 56 and 58, the apparatus 9 is capable of distinguishing between a double note and a single note having a local attachment in the form of a length of adhesive tape centrally positioned relative to the short edges of the note. A waveform such as that shown in FIG. 5B indicates a double note, and the waveforms shown in FIGS. 5E and 5F indicate a single note with a central local attachment.

Means for analyzing the outputs of note sensors in order to determine the status of notes are generally known, and such means do not form part of the present invention. For example, such means are disclosed in UK Patent Applications having Publications Nos. 2058725A and 2106081A and in European Patent Application having Publication No. 0064523. An example of a software approach for analyzing the status of notes in response to the outputs of the sensors 42 and 43 is schematically illustrated in FIG. 6 of the accompanying drawings.

Figure 6:
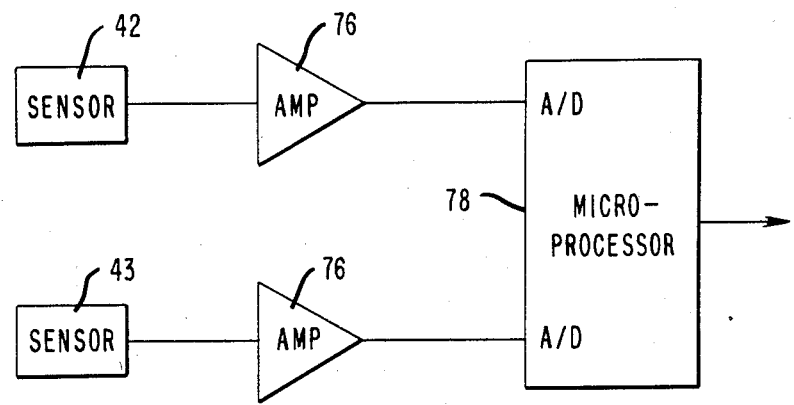
FIG. 6 is a block diagram of a means for analyzing the outputs of the sensors of FIG. 1.

Referring to FIG. 6, the outputs of sensors 42 and 43 are applied via respective amplifiers 76 to analog to digital input ports of a microprocessor 78. The microprocessor 78 can be implemented by a BBC microcomputer type B sold by Acorn Computer Ltd. of Cambridge, England. The microprocessor 78 is programmed to analyze the outputs of the sensors 42 and 43 in order to detect the passage through the apparatus 9 of a single note, double notes, or a note having a local attachment or fold. The output of the microprocessor 78 is applied to utilization means (not shown) which may, for example, include counting means arranged to count a double note as two notes, and is also applied to a diverter gate which diverts notes having local attachments or folds into a reject bin.

What is claimed is:

1. An apparatus for indicating the status of sheets passing therethrough, comprising:
    first and second rollers between which said sheets pass in operation;
    means for mounting said first roller on a first axis of rotation;
    means for mounting said second roller so that its axis is pivotable relative to that of said first roller and so that said second roller is biased towards said first roller to enable the ends of said second roller to be displaced from corresponding ends of said first roller in response to a said sheet passing between said first and second rollers;
    first and second sensing devices spaced apart along said second roller, and said first and second sensing devices being arranged to produce an output signal which changes in accordance with the amount of movement of said ends of said second roller towards or away from said first roller; and
    biasing means for applying at least one pivoting moment to said second roller as a said sheet passes between said first and second rollers;
    said first and second sensing devices being respectively disposed adjacent said ends of said second roller; and
    said biasing means comprising first means for applying a pivoting moment to a first half of the length of said second roller and second means for applying a pivoting moment to the remaining half of said second roller.

2. The apparatus as claimed in claim 1 in which said first means includes a first biasing roll to engage said second roll at a point along said first half, and in which said second means includes a second biasing roll to engage said second roll at a point along said second half;
    said biasing means also including cam means coupled to said first and second biasing rolls to apply said pivoting moments.

3. The apparatus as claimed in claim 2 in which each of said first and second biasing rolls is made of a resilient material.

4. The apparatus as claimed in claim 1 in which said biasing means comprises:
    a cam shaft;
    first and second cams mounted on said cam shaft; said cam shaft having an axis of rotation which is parallel to said fixed axis of rotation;
    first and second cam levers and means for pivotally mounting said first and second cam levers in said apparatus;
    a first cam follower mounted on said first cam lever, and a second cam follower mounted on said second cam lever; and a first biasing roll mounted on said first cam lever, and a second biasing roll mounted on said second cam lever;

said first cam follower being operatively coupled to said first cam to enable said first biasing roll to apply a pivoting moment to a first half of the length of said second roller;

said second cam follower being operatively coupled to said second cam to enable said second biasing roll to apply a pivoting moment to the remaining half of the length of said second roller;

said first and second cams being angularly displaced on said cam shaft; and means for rotating said cam shaft.

5. The apparatus as claimed in claim 4 in which each of said first and second sensing devices is in the form of a linear variable differential transformer.

6. The apparatus as claimed in claim 5 in which said apparatus also includes first and second means for cleaning said first and second rollers, respectively, along the lengths thereof.

* * * * *